United States Patent
Matsumoto et al.

(10) Patent No.: US 9,012,093 B2
(45) Date of Patent: Apr. 21, 2015

(54) SECONDARY BATTERY

(71) Applicants: Kazuaki Matsumoto, Tokyo (JP); Kazuhiko Inoue, Tokyo (JP); Daisuke Kawasaki, Tokyo (JP)

(72) Inventors: Kazuaki Matsumoto, Tokyo (JP); Kazuhiko Inoue, Tokyo (JP); Daisuke Kawasaki, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/006,036

(22) PCT Filed: Feb. 25, 2013

(86) PCT No.: PCT/JP2013/054833
§ 371 (c)(1),
(2) Date: Sep. 18, 2013

(87) PCT Pub. No.: WO2013/129346
PCT Pub. Date: Sep. 6, 2013

(65) Prior Publication Data
US 2014/0377635 A1    Dec. 25, 2014

(30) Foreign Application Priority Data
Mar. 2, 2012  (JP) ................... 2012-047212

(51) Int. Cl.
*H01M 10/02* (2006.01)
*H01M 4/04* (2006.01)
(Continued)

(52) U.S. Cl.
CPC ...... *H01M 10/0568* (2013.01); *H01M 10/0564* (2013.01); *H01M 10/0583* (2013.01); *H01M 4/04* (2013.01); *H01M 4/02* (2013.01); *H01M 2300/0034* (2013.01);
(Continued)

(58) Field of Classification Search
CPC ............ H01M 2300/0017; H01M 2300/0025; H01M 2300/0034; H01M 2300/0037; H01M 2300/004; H01M 10/0583; H01M 10/056; H01M 10/0564; H01M 4/02; H01M 4/04
USPC ................. 429/163, 200, 332, 326, 338, 324
See application file for complete search history.

(56) References Cited

U.S. PATENT DOCUMENTS 6,143,449 A * 11/2000 Kita et al. ..................... 429/326
6,566,015 B1 * 5/2003 Yamada et al. ............... 429/326
(Continued)

FOREIGN PATENT DOCUMENTS

| CN | 101847750 A | 9/2010 |
| EP | 2 330 675 A1 | 6/2011 |

(Continued)

OTHER PUBLICATIONS

Kang Xu et al., "Nonflammable Electrolytes for Li-Ion Batteries Based on a Fluorinated Phosphate," Journal of The Electrochemical Society, 149, pp. A1079-A1082 (2002).
(Continued)

*Primary Examiner* — Kenneth Douyette
(74) *Attorney, Agent, or Firm* — Finnegan, Henderson, Farabow, Garrett & Dunner LLP

(57) ABSTRACT

The present invention provides an electrolyte solution for a lithium ion secondary battery comprising 65 to 99% by volume of a phosphate ester compound, 0.01 to 30% by volume of a fluorinated carbonate compound, and 0.1 to 10% by volume of a halogenated phosphate ester compound and/or 0.1 to 30% by volume of a solvent having a specific dielectric constant of 15 or more, and a lithium ion secondary battery having the same.

20 Claims, 1 Drawing Sheet

(51) Int. Cl.
- *H01M 4/02* (2006.01)
- *H01M 10/0568* (2010.01)
- *H01M 10/0564* (2010.01)
- *H01M 10/0583* (2010.01)
- *H01M 10/0567* (2010.01)
- *H01M 10/0569* (2010.01)
- *H01M 4/62* (2006.01)
- *H01M 10/0525* (2010.01)

(52) U.S. Cl.
CPC ........... *H01M 2300/0017* (2013.01); *H01M 2300/0037* (2013.01); *H01M 2300/004* (2013.01); *H01M 2300/0025* (2013.01); *H01M 10/0567* (2013.01); *H01M 10/0569* (2013.01); *H01M 4/622* (2013.01); *H01M 10/0525* (2013.01); *Y02E 60/122* (2013.01); *Y02T 10/7011* (2013.01); *H01M 2220/20* (2013.01); *H01M 2220/30* (2013.01)

(56) References Cited

U.S. PATENT DOCUMENTS

| | | | |
|---|---|---|---|
| 2003/0180618 A1* | 9/2003 | Inoue et al. | 429/231.1 |
| 2003/0215711 A1 | 11/2003 | Aramata et al. | |
| 2004/0043294 A1* | 3/2004 | Fukui et al. | 429/235 |
| 2005/0118512 A1 | 6/2005 | Onuki et al. | |
| 2007/0092803 A1* | 4/2007 | Nakanishi et al. | 429/326 |
| 2009/0325065 A1 | 12/2009 | Fujii et al. | |
| 2010/0209782 A1* | 8/2010 | Choi et al. | 429/332 |
| 2011/0070504 A1* | 3/2011 | Matsumoto et al. | 429/325 |
| 2011/0195319 A1* | 8/2011 | Okumura et al. | 429/338 |
| 2013/0157117 A1 | 6/2013 | Matsumoto et al. | |

FOREIGN PATENT DOCUMENTS

| | | |
|---|---|---|
| EP | 2 365 573 A2 | 9/2011 |
| EP | 2 613 396 A1 | 7/2013 |
| JP | 08-111238 | 4/1996 |
| JP | 10-154528 | 6/1998 |
| JP | 2000-195544 | 7/2000 |
| JP | 2003-123740 | 4/2003 |
| JP | 2003-173819 | 6/2003 |
| JP | 2004-047404 | 2/2004 |
| JP | 2004-139963 | 5/2004 |
| JP | 3961597 | 8/2007 |
| JP | 2007-299542 | 11/2007 |
| WO | WO 2011/016212 A1 | 2/2011 |
| WO | WO 2012/029551 | 3/2012 |

OTHER PUBLICATIONS

International Search Report, May 7, 2013.

Office Action issued by the Japanese Patent Office in counterpart Japanese Patent Application No. 2013-532009, dated Sep. 18, 2013.

* cited by examiner

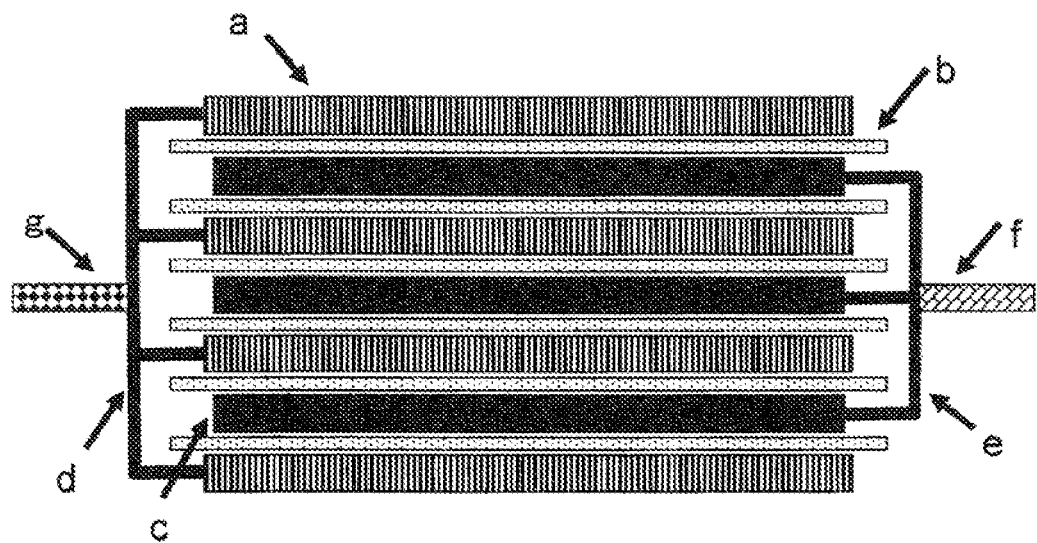

SECONDARY BATTERY

CROSS-REFERENCE TO RELATED PATENT APPLICATIONS

This application is a National Stage Entry of International Application No. PCT/JP2013/054833, filed Feb. 25, 2013, which claims priority from Japanese Patent Application No. 2012-047212, filed Mar. 2, 2012. The entire content of the above-reference applications are expressly incorporated herein by reference.

TECHNICAL FIELD

An embodiment according to the present invention relates to a secondary battery and an electrolyte solution for a secondary battery for use therein, and in particular relates to a lithium ion secondary battery and an electrolyte solution for a secondary battery for use therein.

BACKGROUND ART

With the rapid market expansion of notebook computers, mobile phones, electric cars, and the like, secondary batteries having a high energy density have been demanded. Means for obtaining a secondary battery having a high energy density includes a method using a negative electrode material having a high capacity, and a method using a non-aqueous electrolyte solution which is excellent in stability.

Patent Literature 1 discloses a negative electrode for a secondary battery, provided with an active material layer comprising carbon material particles capable of intercalating and deintercalating lithium ions, metal particles capable of forming an alloy with lithium, and oxide particles capable of intercalating and deintercalating lithium ions. Patent Literature 2 discloses a negative electrode material for a secondary battery, obtained by coating with carbon the surface of particles having a structure in which silicon fine crystals are dispersed in a silicon compound.

CITATION LIST

Patent Literatures

Patent Literature 1: Japanese Patent Publication Laid-Open No. 2003-123740
Patent Literature 2: Japanese Patent Publication Laid-Open No. 2004-47404

Non Patent Literature

Non Patent Literature 1: Journal of The Electrochemical Society, 149 (2002) A1079-A1082

SUMMARY OF INVENTION

Technical Problem

The negative electrode for a secondary battery described in Patent Literature 1 has an effect of reducing the change in volume of the negative electrode as a whole at the time of intercalating and deintercalating lithium, owing to the charge-discharge potential difference among three components. However, the negative electrode in Patent Literature 1 has not been sufficiently studied in many respects such as a relationship among three components in the coexistence state, and a binder, an electrolyte solution, an electrode element structure and an outer casing essential for forming a lithium ion secondary battery. The negative electrode material for a secondary battery described in Patent Literature 2 also has an effect of reducing the change in volume of the negative electrode as a whole. However, the negative electrode material in Patent Literature 2 has not been sufficiently studied in many respects such as a binder, an electrolyte solution, an electrode element structure and an outer casing essential for forming a lithium ion secondary battery.

Therefore, an object of an embodiment according to the present invention is to provide a lithium ion secondary battery using a high-energy negative electrode, the secondary battery having a high capacity and being excellent in cycle characteristics, as well as an electrolyte solution for a secondary battery for use therein.

Solution to Problem

A secondary battery according to the present invention is a secondary battery comprising:
an electrode element in which a positive electrode and a negative electrode are placed so as to face each other,
an electrolyte solution, and
an outer casing enclosing the electrode element and the electrolyte solution therein, wherein
the negative electrode is formed by binding a negative electrode active material comprising at least one of a metal (a) capable of forming alloy with lithium and a metal oxide (b) capable of intercalating and deintercalating lithium ions to a negative electrode current collector by a binder for a negative electrode, and
the electrolyte solution comprises:
65 to 99% by volume, preferably 70 to 99% by volume of a phosphate ester compound,
0.01 to 30% by volume, preferably 1 to 30% by volume of a fluorinated carbonate compound, and
0.1 to 10% by volume of a halogenated phosphate ester compound and/or 0.1 to 30% by volume of a solvent having a specific dielectric constant of 15 or more.

Advantageous Effects of Invention

According to the present invention, there can be provided a lithium ion secondary battery using a high-energy negative electrode, the secondary battery having a high capacity and being excellent in cycle characteristics.

BRIEF DESCRIPTION OF DRAWINGS

FIG. 1 is a schematic cross-sectional view illustrating a structure of an electrode element in a stacked laminate type secondary battery.

DESCRIPTION OF EMBODIMENTS

Hereinafter, the present embodiment will be described in detail.

In a secondary battery according to the present embodiment, an electrode element in which a positive electrode and a negative electrode are placed so as to face each other, and an electrolyte solution are enclosed in an outer casing. The shape of the secondary battery may be any of cylindrical type, flattened winding square type, stacked square type, coin type, flattened winding laminate type, and stacked laminate type, but is preferably a stacked laminate type. Hereinafter, a stacked laminate type secondary battery will be described.

FIG. 1 is a schematic cross-sectional view illustrating a structure of an electrode element in a stacked laminate type secondary battery. The electrode element is formed by alternately stacking a plurality of positive electrodes c and a plurality of negative electrodes a with separators b sandwiched therebetween. Positive electrode current collectors e which the respective positive electrodes c have are mutually welded at an end portion not covered with a positive electrode active material to be electrically connected, and a positive electrode terminal f is further welded to the welded portion. Negative electrode current collectors d which the respective negative electrodes a have are mutually welded at an end portion not covered with a negative electrode active material to be electrically connected, and a negative electrode terminal g is further welded to the welded portion.

The electrode element having such a planar stacking structure has an advantage in that it is hardly adversely affected by the volume change of the electrodes associated with charge-discharge, as compared with an electrode element having a winding structure, because of having no portion having small R (region near the winding core of a winding structure). That is, the electrode element is effective as an electrode element using an active material that easily causes volume expansion. In contrast, in the electrode element having a winding structure, since electrodes are curved, the structure is easily distorted when the volume change occurs. In particular, in the case where a negative electrode active material that causes a large volume change associated with charge-discharge, such as silicon oxide, is used, the capacity of a secondary battery using the electrode element having a winding structure is considerably reduced associated with charge-discharge.

On the other hand, the electrode element having a planar stacking structure has such a problem that if gas is generated between the electrodes, the generated gas easily accumulates between the electrodes. This is due to the fact that while the interval between the electrodes hardly extends owing to the tension applied to the electrodes in the case of the electrode element having a winding structure, the interval between the electrodes easily extends in the case of the electrode element having a stacking structure. In the case where an outer casing is made of an aluminum laminate film, such a problem is particularly significant.

In the present embodiment, it is possible to solve the above problem and to realize a high capacity and excellent heat stability also in a stacked laminate type lithium ion secondary battery using a high-energy type negative electrode.

<Negative Electrode>

A negative electrode is formed by binding a negative electrode active material to a negative electrode current collector by a binder for a negative electrode so that the current collector is covered with the negative electrode active material. In the present embodiment, the negative electrode active material contains at least one of a metal (a) capable of forming an alloy with lithium and a metal oxide (b) capable of intercalating and deintercalating lithium ions. That is, the negative electrode active material may contain only any one of the metal (a) and the metal oxide (b), but preferably contains the metal (a) and the metal oxide (b).

As the metal (a), Al, Si, Pb, Sn, In, Bi, Ag, Ba, Ca, Hg, Pd, Pt, Te, Zn, La, or an alloy of two or more thereof may be used. In particular, the metal (a) preferably comprises silicon (Si). The content of the metal (a) in the negative electrode active material may be 0% by mass or 100% by mass, but it is preferably 5% by mass or more and 95% by mass or less, more preferably 10% by mass or more and 90% by mass or less, and furthermore preferably 20% by mass or more and 50% by mass or less.

As the metal oxide (b), silicon oxide, aluminum oxide, tin oxide, indium oxide, zinc oxide, lithium oxide, or a composite thereof may be used. In particular, the metal oxide (b) preferably contains silicon oxide. This is because silicon oxide is relatively stable and is hardly caused to react with other compounds. In addition, one or two or more elements selected from nitrogen, boron and sulfur may also be added to the metal oxide (b) in an amount of, for example, 0.1 to 5% by mass. Such addition can improve the electric conductivity of the metal oxide (b). The content of the metal oxide (b) in the negative electrode active material may be 0% by mass or 100% by mass, but it is preferably 5% by mass or more and 90% by mass or less, more preferably 40% by mass or more and 80% by mass or less, and further preferably 50% by mass or more and 70% by mass or less.

All or a part of the metal oxide (b) preferably has an amorphous structure. The metal oxide (b) having an amorphous structure can suppress volume expansion of a carbon material (c) and the metal (a), which are other negative electrode active materials. This mechanism is not clear, but it is presumed that an amorphous structure of the metal oxide (b) has some influence on film formation at the interface between the carbon material (c) and an electrolyte solution. In addition, it is considered that an amorphous structure has relatively a few factors due to ununiformity such as crystal grain boundary or defect. Herein, it can be confirmed by X-ray diffraction measurement (general XRD measurement) whether all or a part of the metal oxide (b) has an amorphous structure. Specifically, while a peak unique to the metal oxide (b) is observed in the case where the metal oxide (b) does not have an amorphous structure, a peak unique to the metal oxide (b) is observed to be broad in the case where all or a part of the metal oxide (b) has an amorphous structure.

In the case where the negative electrode active material comprises the metal (a) and the metal oxide (b), all or a part of the metal (a) is preferably dispersed in the metal oxide (b). At least, a part of the metal (a) is dispersed in the metal oxide (b), thereby making it possible to further suppress the volume expansion of the negative electrode as a whole, and also to suppress the degradation of the electrolyte solution. Herein, it can be confirmed by using transmission electron microscope observation (general TEM observation) in combination with energy dispersive X-ray spectroscopy measurement (general EDX measurement) that all or a part of the metal (a) is dispersed in the metal oxide (b). Specifically, the cross section of a sample containing metal particles (a) is observed, and the oxygen concentration of the metal particles (a) dispersed in the metal oxide (b) is measured, thereby to confirm that the metal constituting the metal particles (a) is not converted into an oxide thereof Furthermore, in the case where the negative electrode active material contains the metal (a) and the metal oxide (b), the metal oxide (b) is preferably an oxide of a metal constituting the metal (a).

In the case where the negative electrode active material contains the metal (a) and the metal oxide (b), the proportions of the metal (a) and the metal oxide (b) are not particularly limited. The proportion of the metal (a) is preferably 5% by mass or more and 90% by mass or less, and preferably 30% by mass or more and 60% by mass or less relative to the total of the metal (a) and the metal oxide (b). The proportion of the metal oxide (b) is preferably 10% by mass or more and 95% by mass or less and preferably 40% by mass or more and 70% by mass or less relative to the total of the metal (a) and the metal oxide (b).

The negative electrode active material may further contain the carbon material (c). As the carbon material (c), carbon, amorphous carbon, diamond-like carbon, carbon nanotube, or a composite thereof may be used. Herein, carbon having high crystallinity has a high electric conductivity, and is excellent in adhesiveness with a positive electrode current collector made of a metal such as copper and excellent in voltage flatness. On the other hand, since amorphous carbon having low crystallinity has relatively low volume expansion, it has a high effect of reducing the volume expansion of the negative electrode as a whole, and hardly causes deterioration due to ununiformity such as crystal grain boundary or defect. The content of the carbon material (c) in the negative electrode active material may be 0% by mass, but it is preferably 2% by mass or more and 50% by mass or less and more preferably 2% by mass or more and 30% by mass or less.

The negative electrode active material preferably contains the metal (a), the metal oxide (b) and the carbon material (c). If the negative electrode active material contains the metal (a), the metal oxide (b) and the carbon material (c), the proportions of the metal (a), the metal oxide (b) and the carbon material (c) are not particularly limited. The proportion of the metal (a) is preferably 5% by mass or more and 90% by mass or less, and more preferably 20% by mass or more and 50% by mass or less relative to the total of the metal (a), the metal oxide (b) and the carbon material (c). The proportion of the metal oxide (b) is preferably 5% by mass or more and 90% by mass or less, and more preferably 40% by mass or more and 70% by mass or less relative to the total of the metal (a), the metal oxide (b) and the carbon material (c). The proportion of the carbon material (c) is preferably 2% by mass or more and 50% by mass or less, and more preferably 2% by mass or more and 30% by mass or less relative to the total of the metal (a), the metal oxide (b) and the carbon material (c).

While the metal (a), the metal oxide (b) and the carbon material (c) are not particularly limited, each of them may be used in the form of particles. For example, the average particle size of the metal (a) may be set so as to be smaller than the average particle size of the carbon material (c) and the average particle size of the metal oxide (b). Since such setting allows the metal (a), in which the volume change associated with charge-discharge is larger, to have a relatively small particle size and allows the metal oxide (b) and the carbon material (c), in which the volume change associated with charge-discharge is smaller, to have a relatively large particle size, dendrite generation and pulverization of an alloy are further effectively suppressed. In addition, lithium is intercalated into and deintercalated from the larger size particle, the smaller size particle, and the larger size particle in this order in the course of charge-discharge, and also from this point, the occurrence of residual stress and residual distortion is suppressed. The average particle size of the metal (a) can be, for example, 20 µm or less, and is preferably 15 µm or less.

The negative electrode active material containing the metal (a), the metal oxide (b) and the carbon material (c), in which all or a part of the metal oxide (b) has an amorphous structure and all or a part of the metal (a) is dispersed in the metal oxide (b), can be produced by the method disclosed in, for example, Patent Literature 2. That is, the metal oxide (b) can be subjected to a CVD treatment under an atmosphere containing an organic gas such as methane gas to thereby provide a composite in which the metal (a) in the metal oxide (b) forms nanocluster and the surface thereof is covered with the carbon material (c). The negative electrode active material can also be produced by mixing the metal (a), the metal oxide (b) and the carbon material (c) by mechanical milling.

As the binder for a negative electrode, polyvinylidene fluoride, a polyvinylidene fluoride-hexafluoropropylene copolymer, a polyvinylidene fluoride-tetrafluoroethylene copolymer, a styrene-butadiene copolymerized rubber, polytetrafluoroethylene, polypropylene, polyethylene, polyimide, polyamide-imide, or the like may be used. Among them, polyimide or polyamide-imide is preferable because of its strong binding property. The amount of the binder for a negative electrode to be used is preferably 5 to 25 parts by mass relative to 100 parts by mass of the negative electrode active material from the viewpoints of "sufficient binding force" and "high energy" which are in trade-off relationship to each other.

As the negative electrode current collector, aluminum, nickel, copper, silver, and alloys thereof are preferable in terms of electrochemical stability. The shape thereof includes foil, flat plate, and mesh.

The negative electrode can be produced by forming a negative electrode active material layer comprising the negative electrode active material and the binder for a negative electrode on the negative electrode current collector. The method for forming the negative electrode active material layer includes a doctor blade method, a die coater method, a CVD method, and a sputtering method. The negative electrode current collector may also be obtained by forming the negative electrode active material layer in advance, and then forming a thin film made of aluminum, nickel, or an alloy thereof by a method such as vapor deposition or sputtering.

<Positive Electrode>

A positive electrode is formed by, for example, binding a positive electrode active material to a positive electrode current collector by a binder for a positive electrode so that the current collector is covered with the positive electrode active material.

The positive electrode active material includes lithium manganates having a layered structure or lithium manganates having a spinel structure, such as $LiMnO_2$, $Li_xMn_2O_4$ ($0<x<2$), $Li_2MnO_3$, and $Li_xMn_{1.5}Ni_{0.5}O_4$ ($0<x<2$); $LiCoO_2$, $LiNiO_2$, or materials in which a part of such transition metals is substituted with other metal; lithium transition metal oxides such as $LiNi_{1/3}Co_{1/3}Mn_{1/3}O_2$ in which the proportion of a particular transition metal does not exceed a half; materials having Li in an excessive amount as compared with the stoichiometric composition in these lithium transition metal oxides; and materials having an olivine structure such as $LiFePO_4$. Materials obtained by substituting a part of these metal oxides with Al, Fe, P, Ti, Si, Pb, Sn, In, Bi, Ag, Ba, Ca, Hg, Pd, Pt, Te, Zn, La, or the like may also be used. In particular, $Li_\alpha Ni_\beta Co_\gamma Al_\delta O_2$ ($1 \leq \alpha \leq 2$, $\beta+\gamma+\delta=1$, $\beta \geq 0.7$, $\gamma \leq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, $\gamma \leq 0.2$) is preferable. Such positive electrode active materials may be used alone, or in combination of two or more thereof.

A radical material or the like may also be used as the positive electrode active material.

As the binder for a positive electrode, the same as the binder for a negative electrode can be used. In particular, polyvinylidene fluoride is preferable from the viewpoints of general versatility and low cost. The amount of the binder for a positive electrode to be used is preferably 2 to 15 parts by mass relative to 100 parts by mass of the positive electrode active material from the viewpoints of "sufficient binding force" and "high energy" which are in trade-off relationship to each other.

As the positive electrode current collector, the same as the negative electrode current collector can be used.

A conductive auxiliary material may also be added to a positive electrode active material layer containing the positive electrode active material for the purpose of reducing impedance. The conductive auxiliary material includes carbonaceous fine particles such as graphite, carbon black, and acetylene black.

<Electrolyte Solution>

An electrolyte solution for use in the present embodiment comprises a phosphate eater compound and a fluorinated carbonate compound, and further comprises at least one of a halogenated phosphate ester compound and a solvent having a high specific dielectric constant (hereinafter, referred to the "solvent having a high specific dielectric constant" as the "high dielectric constant solvent" in some cases). It is to be noted that in the present invention, when simply being described as the "phosphate ester compound", the phosphate ester compound does not encompass the halogenated phosphate ester compound and denotes a "non-halogenated phosphate ester compound", unless expressly indicated.

Examples of the phosphate ester compound include a compound represented by the following formula (1).

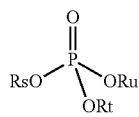

(1)

In the formula (1), Rs, Rt and Ru each independently represent an alkyl group, alkenyl group, an aryl group, a cycloalkyl group, or a silyl group, and any two or all of Rs, Rt and Ru may be bonded to form a cyclic structure. Rs, Rt and Ru may be the same or different from one another. An alkyl group, an alkenyl group, an aryl group, and a cycloalkyl group preferably have 10 or less carbon atoms. All of Rs, Rt and Ru are more preferably an alkyl group having 10 or less carbon atoms.

Specific examples of the phosphate ester compound include alkyl phosphate ester compounds such as trimethyl phosphate, triethyl phosphate, tripropyl phosphate, tributyl phosphate, tripentyl phosphate, trihexyl phosphate, triheptyl phosphate, trioctyl phosphate, dimethyl ethyl phosphate (alias name: dimethyl ethylphosphonate), dimethyl methyl phosphate (DMMP) (alias name: dimethyl methylphosphonate), and diethyl methyl phosphate; aryl phosphate ester compounds such as triphenyl phosphate; and phosphate ester compounds having a cyclic structure, such as methyl ethylene phosphate, ethyl ethylene phosphate (EEP), and ethyl butylene phosphate. Among them, as the phosphate ester compound, a trialkyl phosphate ester compound such as trimethyl phosphate, triethyl phosphate, tripropyl phosphate, tributyl phosphate, tripentyl phosphate, trihexyl phosphate, triheptyl phosphate, or trioctyl phosphate is preferably used. Such phosphate ester compounds can be used alone, or in combination of two or more thereof.

The electrolyte solution for use in the present embodiment preferably contains the phosphate ester compound as the main solvent. The phosphate ester compound is used as the main solvent of the electrolyte solution, thereby improving affinity between the separator and the electrolyte solution of the present embodiment, facilitating the penetration of the electrolyte solution into the separator, and improving ion conductivity. The content of the phosphate ester compound in the electrolyte solution of the present embodiment is 65% by volume to 99% by volume, preferably 70% by volume or more, preferably 70 to 99% by volume, more preferably 85 to 99% by volume, and furthermore preferably 90 to 97% by volume.

The fluorinated carbonate compound may be a fluorinated cyclic carbonate compound or a fluorinated linear carbonate compound. Such fluorinated carbonate compounds may be used alone, or in combination of two or more thereof.

Examples of the fluorinated cyclic carbonate compound include a compound represented by the following formula (3a) or (3b):

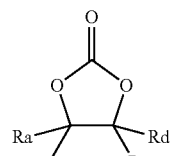

(3a)

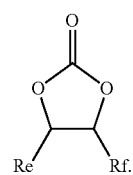

(3b)

In the formula (3a) or (3b), Ra, Rb, Rc, Rd, Re and Rf each independently represent a hydrogen atom, an alkyl group, a halogenated alkyl group, a halogen atom, an alkenyl group, a halogenated alkenyl group, a cyano group, an amino group, a nitro group, an alkoxy group, a halogenated alkoxy group, a cycloalkyl group, a halogenated cycloalkyl group, or a silyl group. Herein, at least one of Ra, Rb, Rc and Rd is a fluorine atom, a fluorinated alkyl group, a fluorinated alkenyl group, a fluorinated alkoxy group, or a fluorinated cycloalkyl group, and at least one of Re and Rf is a fluorine atom, a fluorinated alkyl group, a fluorinated alkenyl group, a fluorinated alkoxy group, or a fluorinated cycloalkyl group. An alkyl group, a halogenated alkyl group, alkenyl group, a halogenated alkenyl group, an alkoxy group, a halogenated alkoxy group, a cycloalkyl group, and a halogenated cycloalkyl group preferably have 10 or less carbon atoms, more preferably 5 or less carbon atoms. Halogen atoms of a halogenated alkyl group, a halogenated alkenyl group, a halogenated alkoxy group, and a halogenated cycloalkyl group include fluorine, chlorine, bromine, and iodine.

As the fluorinated cyclic carbonate compound, a compound may be used in which all or a part of hydrogen atoms of ethylene carbonate, propylene carbonate, vinylene carbonate, or vinylethylene carbonate is(are) fluorinated. More specifically, for example, 4-fluoro-1,3-dioxolane-2-one (fluoroethylene carbonate, also referred to as FEC), (cis or trans) 4,5-difluoro-1,3-dioxolane-2-one (also referred to as (cis or trans) difluoroethylene carbonate), 4,4-difluoro-1,3-dioxolane -2-one, or 4-fluoro-5-methyl-1,3-dioxolane-2-one may be used. Among them, fluoroethylene carbonate is preferable.

Examples of the fluorinated linear carbonate compound include a compound represented by the following formula (4):

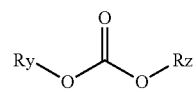

(4)

In the formula (4), Ry and Rz each independently represent a hydrogen atom, an alkyl group, a halogenated alkyl group, a halogen atom, alkenyl group, a halogenated alkenyl group, cyano group, an amino group, a nitro group, an alkoxy group, a halogenated alkoxy group, a cycloalkyl group, a halogenated cycloalkyl group, or a silyl group. Herein, at least one of Ry and Rz represents a fluorine atom, a fluorinated alkyl group, a fluorinated alkenyl group, a fluorinated alkoxy group, or a fluorinated cycloalkyl group. An alkyl group, a halogenated alkyl group, alkenyl group, a halogenated alkenyl group, an alkoxy group, a halogenated alkoxy group, a cycloalkyl group, and a halogenated cycloalkyl group preferably have 10 or less carbon atoms, more preferably 5 or less carbon atoms. Halogen atoms of a halogenated alkyl group, a halogenated alkenyl group, a halogenated alkoxy group, and a halogenated cycloalkyl group include fluorine, chlorine, bromine, and iodine.

The fluorinated linear carbonate compound is not particularly limited, and for example, a compound may also be used in which a part or all of hydrogen atoms of dimethyl carbonate, diethyl carbonate, ethyl methyl carbonate, dipropyl carbonate, and methyl propyl carbonate is(are) substituted with fluorine. More specific examples thereof include bis(1-fluoroethyl)carbonate, bis(2-fluoroethyl)carbonate, 3-fluoropropyl methyl carbonate, and 3,3,3-trifluoropropyl methyl carbonate.

In the present embodiment, the content of the fluorinated carbonate compound in the electrolyte solution is 0.01% by volume or more and 50% by volume or less, preferably 0.01% by volume or more and 30% by volume or less and more preferably 1% by volume or more and 30% by volume or less, and preferably 15% by volume or less in order to improve the flame retardancy of the electrolyte solution. While discharge capacity increases when the electrolyte solution comprises the fluorinated carbonate compound, too large amount thereof tends to increase viscosity in the electrolyte solution, leading to increase in resistance.

Examples of the halogenated phosphate ester compound include the following formula (2).

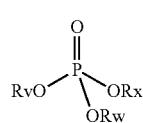

(2)

In the formula (2), Rv, Rw and Rx each independently represent a halogenated alkyl group, a halogenated alkenyl group, a halogenated cycloalkyl group, a halogenated aryl group, or a silyl group, and any two or all of Rv, Rw and Rx may be bonded to form a cyclic structure. Herein, at least one of Rv, Rw and Rx represents a halogenated alkyl group, a halogenated alkenyl group, a halogenated cycloalkyl group, or a halogenated aryl group. A halogenated alkyl group, a halogenated alkenyl group and a halogenated cycloalkyl group or a halogenated aryl group preferably have 10 or less carbon atoms. Halogen atoms of a halogenated alkyl group, a halogenated alkenyl group, a halogenated cycloalkyl group, and a halogenated aryl group include fluorine, chlorine, bromine, and iodine, and fluorine is preferable. All of Rv, Rw and Rx are preferably a halogenated alkyl group having 10 or less carbon atoms, and more preferably fluorinated alkyl having 10 or less carbon atoms.

The content of the halogenated phosphate ester compound in the electrolyte solution is preferably 20% by volume or less (including 0% by volume), more preferably 0.1 to 10% by volume, and preferably 1% by volume or more, more preferably 2% by volume or more, and preferably 5% by volume or less.

Specific examples of the halogenated phosphate ester compound include halogenated alkyl phosphate ester compounds such as Tris(trifluoromethyl)phosphate, Tris(pentafluoroethyl)phosphate, Tris(2,2,2-trifluoroethyl)phosphate (TTFP: specific dielectric constant: 11), Tris(2,2,3,3-tetrafluoropropyl)phosphate, Tris(3,3,3-trifluoropropyl)phosphate, and Tris(2,2,3,3,3-pentafluoropropyl)phosphate. Among them, as the fluorinated phosphate ester compound, Tris(2,2,2-trifluoroethyl)phosphate (TTFP) is preferable. Such halogenated phosphate ester compounds can be used alone, or in combination of two or more thereof.

Herein, if the fluorinated phosphate ester compound has a large amount of fluorine atoms, a lithium salt for use as a support salt is hardly dissolved therein, and thus the phosphate ester compound is preferably the main solvent.

In the present embodiment, the solvent having a high specific dielectric constant (also referred to as the high dielectric constant solvent) refers to a solvent having a specific dielectric constant of 15 or more. The solvent having a high specific dielectric constant include ethylene carbonate (EC: specific dielectric constant: 90), propylene carbonate (PC: specific dielectric constant: 65), γ-butyrolactone (specific dielectric constant: 42), γ-valerolactone (specific dielectric constant: 34), sulfolane (SL: specific dielectric constant: 43), 3-methylsulfolene (specific dielectric constant: 30), acetonitrile (AN: specific dielectric constant: 36), dimethyl sulfoxide (DMSO: specific dielectric constant: 47), dimethyl formamide (DMF: specific dielectric constant: 37), 3-methyl-2-oxazolidinone (specific dielectric constant: 78), and ethyl trifluoroacetate (EFA: specific dielectric constant: 16). It also includes methyl benzenesulfonate, diphenyl sulfone, dimethyl sulfone, ethyl methyl sulfone, dimethyl formamide, and 1,3-dimethyl-2-imidazolidinone. More desirably, the value of the specific dielectric constant is desirably 30 or more. It is to be noted that in the present specification, the "solvent having a specific dielectric constant of 15 or more" is different from the phosphate ester compound, the fluorinated carbonate compound, and the halogenated phosphate ester compound.

The content of the solvent having a high specific dielectric constant (high dielectric constant solvent) in the electrolyte solution is preferably 50% by volume or less (including 0% by volume), more preferably 0.1 to 30% by volume, and further preferably 20% by volume or less. If the content of the high dielectric constant solvent is too high, the viscosity of the electrolyte solution is increased.

The electrolyte solution of the present embodiment comprises any one of or both of the halogenated phosphate ester compound and the high dielectric constant solvent.

The electrolyte solution used for the present embodiment may contain other organic solvent. Other organic solvent includes butylene carbonate (BC), vinylene carbonate (VC), vinylethylene carbonate (VEC), ethylene sulfite (ES), propane sultone (PS), butane sultone (BS), Dioxathiolane-2,2-dioxide (DD), sulfolene, succinic anhydride (SUCAH), propionic anhydride, acetic anhydride, maleic anhydride, diallyl carbonate (DAC), dimethyl 2,5-dioxahexanedioate, diethyl 2,5-dioxahexanedioate, furan, 2,5-dimethylfuran, diphenyl disulfide (DPS), dimethyl carbonate (DMC), ethyl methyl carbonate (EMC), chloroethylene carbonate, diethyl carbonate (DEC), dimethoxyethane (DME), dimethoxymethane (DMM), diethoxyethane (DEE), ethoxymethoxyethane, dimethyl ether, methyl ethyl ether, methyl propyl ether, ethyl propyl ether, dipropyl ether, methyl butyl ether, diethyl ether, phenyl methyl ether, tetrahydrofuran (THF), 2-methyltetrahydrofuran (2-MeTHF), tetrahydropyran (THP), 1,4-dioxane (DIOX), 1,3-dioxolane (DOL), methyl acetate, ethyl acetate, propyl acetate, isopropyl acetate, butyl acetate, methyl difluoroacetate, methyl propionate, ethyl propionate, propyl propionate, methyl formate, ethyl formate, ethyl butyrate, isopropyl butyrate, methyl isobutyrate, methyl cyanoacetate, vinyl acetate, diphenyl disulfide, dimethyl sulfide, diethyl sulfide, adiponitrile, valeronitrile, glutaronitrile, malononitrile, succinonitrile, pimelonitrile, suberonitrile, isobutyronitrile, biphenyl, thiophene, methyl ethyl ketone, fluorobenzene, hexafluorobenzene, a carbonate electrolyte solution, grime, ether, acetonitrile, propionitrile, an ionic liquid, phosphazene, aliphatic carboxylic acid esters such as methyl formate, methyl acetate, and ethyl propionate, or those in which a part of hydrogen atoms of these compounds is substituted with a fluorine atom. Among them, diethyl carbonate, dimethyl carbonate, and ethyl methyl carbonate are preferable. The content of the other organic solvent(s) is(are) preferably 1% by volume or more and 30% by volume or less for the purpose of achieving a sufficient effect of improving capacity. Such other organic solvents may be used alone, or in combination of two or more thereof.

The electrolyte solution for use in the present invention may also contain, in addition to the fluorinated carbonate compound, a carbonate compound (hereinafter, also referred to as the non-fluorinated carbonate compound) other than the fluorinated carbonate compound. By using the non-fluorinated carbonate, the ion dissociation ability of the electrolyte solution is improved, and also, the viscosity of the electrolyte solution is decreased. Therefore, ion mobility can be improved. The non-fluorinated carbonate includes a compound having the same structure as the cyclic or linear fluorinated carbonate compound described above and comprising no fluorine. The content of the non-fluorinated carbonate in the total electrolyte solution is desirably 30% by volume or less, and more preferably 15% by volume or less.

The electrolyte solution may also be mixed with, for example, trimethyl phosphate, triethyl phosphate, tripropyl phosphate, trioctyl phosphate, triphenyl phosphate, a fluorinated ether having an Rv1-O-Rv2 (wherein Rv1 and Rv2 are each an alkyl group or a fluorine-containing alkyl group) structure, an ionic liquid, and phosphazone in order to improve a flame-retardant effect.

The electrolyte solution for use in the present embodiment comprises a support salt. Specific examples of the support salt include $LiPF_6$, $LiI$, $LiBr$, $LiCl$, $LiAsF_6$, $LiAlCl_4$, $LiClO_4$, $LiBF_4$, $LiSbF_6$, $Li_3PO_4$, $Li_2HPO_4$, $LiH_2PO_4$, $LiCF_3SO_3$, $LiC_4F_9SO_3$, and $LiN(FSO_2)_2$, $LiN(CF_3SO_2)_2$, $LiN(C_2F_5SO_2)_2$, $LiN(CF_3SO_2)(C_2F_5SO_2)$, $LiN(CF_3SO_2)(C_4F_9SO_2)$, $LiN(CF_2SO_2)_2(CF_2)$ having a 5-membered ring structure, and $LiN(CF_2SO_2)_2(CF_2)_2$ having a 6-membered ring structure, which comprising an imide anion. They also include lithium salts in which at least one fluorine atom of $LiPF_6$ is substituted with an alkyl fluoride group, such as $LiPF_5(CF_3)$, $LiPF_5(C_2F_5)$, $LiPF_5(C_3F_7)$, $LiPF_4(CF_3)_2$, $LiPF_4(CF_3)(C_2F_5)$, and $LiPF_3(CF_3)_3$. As the support salt, a compound represented by the following formula (5):

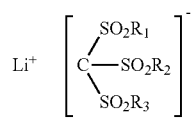

(5)

may also be used. In the formula (5), $R_1$, $R_2$ and $R_3$ each independently represent a halogen atom or an alkyl fluoride group. A halogen atom includes fluorine, chlorine, bromine, and iodine. An alkyl fluoride group preferably has 1 to 10 carbon atoms. Specific examples of the compound represented by the following formula (5) include $LiC(CF_3SO_2)_3$ and $LiC(C_2F_5SO_2)_3$. Such support salts may be used alone, or in combination of two or more thereof. For example, $LiPF_6$ and a salt containing an imide anion having a high pyrolysis temperature, such as $LiN(FSO_2)_2$, $LiN(CF_3SO_2)_2$, $LiN(C_2F_5SO_2)_2$, $LiN(CF_3SO_2)(C_2F_5SO_2)$, or $LiN(CF_3SO_2)(C_4F_9SO_2)$, may be mixed and used.

The concentration of the support salt in the electrolyte solution is preferably 0.01M (mol/L) or more and 3M (mol/L) or less, and more preferably 0.1M (mol/L) or more and 1.5M (mol/L) or less.

It is desirable that the amount of the electrolyte solution is appropriately adjusted depending on the porosities of the positive electrode, the negative electrode and the separator. The amount of the electrolyte solution is preferably 0.2 or more and 2.0 or less, and more preferably 0.5 or more and 1.5 or less when the total void volume of the positive electrode, the negative electrode and the separator is assumed to be 1.0. In addition, the amount of the electrolyte solution is preferably 1.2 or less and more preferably 1.2 or less from the viewpoint of further easily suppressing the occurrence of gas at high temperatures.

<Separator>

As the separator, a porous film or non-woven fabric made of polypropylene, polyethylene, or the like may be used. One obtained by stacking the film and fabric may also be used as the separator. In addition, polyimide, polyamide-imide, polyvinylidene fluoride (PVDF), polytetrafluorovinylidene (PTFE), cellulose, or glass fiber having a high heat resistance can also be used. A woven fabric separator obtained by bundling fibers thereof in the form of string to provide a woven fabric may also be used.

<Outer Casing>

An outer casing can be appropriately selected as long as it is stable in the electrolyte solution and has sufficient steam gas barrier properties. For example, in the case of a stacked laminate type secondary battery, a laminate film made of polypropylene, polyethylene, or the like, coated with aluminum or silica, may be used as the outer casing. In particular, an aluminum laminate film is preferably used from the viewpoint of suppressing volume expansion.

EXAMPLES

Hereinafter, the present embodiment will be described in more detail by means of Examples.

Example 1

A silicon oxide-silicon mixed powder (mixture of silicon oxide and silicon) represented by the general formula SiO was subjected to a CVD treatment under an atmosphere containing methane gas at 1150° C. for 6 hours, to obtain a silicon-silicon oxide-carbon composite (negative electrode active material) in which silicon in silicon oxide was dispersed in the form of nanocluster and whose surface was covered with carbon. The mass ratio of silicon/silicon oxide/carbon was adjusted so as to be about 31/64/5.

The negative electrode active material (average particle size D50=5 μm) and polyimide ((produced by Ube Industries, Ltd., trade name: U varnish A) as a binder for a negative electrode were weighed in a mass ratio of 90:10, and they were mixed with n-methylpyrrolidone to form a negative electrode slurry. The negative electrode slurry was applied to a copper foil having a thickness of 10 μm, then dried and also subjected to a heat treatment at 300° C. in a nitrogen atmosphere, thereby producing a negative electrode.

Lithium nickelate ($LiNi_{0.80}Co_{0.15}Al_{0.15}O_2$) as a positive electrode active material, carbon black as a conductive auxiliary material, and polyvinylidene fluoride as a binder for a positive electrode were weighed in a mass ratio of 90:5:5, and they were mixed with n-methylpyrrolidone to form a positive electrode slurry. The positive electrode slurry was applied to an aluminum foil having a thickness of 20 μm, then dried and also pressed, thereby producing a positive electrode.

One layer of the obtained positive electrode and two layers of the obtained negative electrodes were stacked while a polypropylene porous film as a separator was sandwiched therebetween alternately. An end portion of a positive electrode current collector not covered with the positive electrode active material and an end portion of a negative electrode current collector not covered with the negative electrode active material were respectively welded, and the welded portions were further welded to a positive electrode terminal made of aluminum and a negative electrode terminal made of nickel, respectively, thereby providing an electrode element having a planar stacking structure.

On the other hand, as an electrolyte solution, triethyl phosphate (hereinafter, abbreviated as TEP), fluoroethylene carbonate (hereinafter, abbreviated as FEC), and TTFP were mixed in a ratio of 93:5:2 (volume ratio) and further $LiPF_6$ as a support salt was dissolved in a concentration of 1 mol/L.

The electrode element was enclosed in an aluminum laminate film as an outer casing, the electrolyte solution was injected into the casing, and the casing was sealed while being evacuated to a pressure of 0.1 atm, thereby producing a secondary battery.

[Charge-Discharge Evaluation]

The obtained secondary battery was charged to the upper limit voltage of 4.2 V at an electric current of 1 C under an environment of 20° C., thereafter maintained at a constant voltage of 4.2 V until the total time reached 2 hours and 30 minutes, and thereafter discharged to the lower limit voltage of 2.7 V. The result at that time was calculated by the following:

Cycle retention ratio (capacity retention ratio)(%)= 100×discharge capacity (20th cycle)/discharge capacity (1st cycle).

The result is shown in Table 1.

Example 2

The same manner as in Example 1 was performed except that the electrolyte solution in which TEP, FEC and TTFP were mixed in a ratio of TEP:FEC:TTFP=90:5:5 (volume ratio) and further $LiPF_6$ as the support salt was dissolved in a concentration of 1 mol/L was used. The result is shown in Table 1.

Example 3

The same manner as in Example 1 was performed except that the electrolyte solution in which TEP, FEC and TTFP were mixed in a ratio of TEP:FEC:TTFP=85:5:10 (volume ratio) and further $LiPF_6$ as the support salt was dissolved in a concentration of 1 mol/L was used. The result is shown in Table 1.

Comparative Example 4

The same manner as in Example 1 was performed except that the electrolyte solution in which TEP, FEC and TTFP were mixed in a ratio of TEP:FEC:TTFP=75:5:20 (volume ratio) and further $LiPF_6$ as the support salt was dissolved in a concentration of 1 mol/L was used. The result is shown in Table 1.

Example 5

The same manner as in Example 1 was performed except that the electrolyte solution in which TEP, FEC and EC were mixed in a ratio of TEP:FEC:EC=90:5:5 (volume ratio) and further $LiPF_6$ as the support salt was dissolved in a concentration of 1 mol/L was used. The result is shown in Table 1.

Example 6

The same manner as in Example 1 was performed except that the electrolyte solution in which TEP, FEC and EC were mixed in a ratio of TEP:FEC:EC=85:5:10 (volume ratio) and further $LiPF_6$ as the support salt was dissolved in a concentration of 1 mol/L was used. The result is shown in Table 1.

Example 7

The same manner as in Example 1 was performed except that the electrolyte solution in which TEP, FEC and EC were mixed in a ratio of TEP:FEC:EC=75:5:20 (volume ratio) and further $LiPF_6$ as the support salt was dissolved in a concentration of 1 mol/L was used. The result is shown in Table 1.

Example 8

The same manner as in Example 1 was performed except that the electrolyte solution in which TEP, FEC and SL were mixed in a ratio of TEP:FEC:SL=90:5:5 (volume ratio) and further $LiPF_6$ as the support salt was dissolved in a concentration of 1 mol/L was used. The result is shown in Table 1.

Example 9

The same manner as in Example 1 was performed except that the electrolyte solution in which TEP, FEC and SL were mixed in a ratio of TEP:FEC:SL=85:5:10 (volume ratio) and further $LiPF_6$ as the support salt was dissolved in a concentration of 1 mol/L was used. The result is shown in Table 1.

Example 10

The same manner as in Example 1 was performed except that the electrolyte solution in which TEP, FEC and SL were mixed in a ratio of TEP:FEC:SL=75:5:20 (volume ratio) and further $LiPF_6$ as the support salt was dissolved in a concentration of 1 mol/L was used. The result is shown in Table 1.

Example 11

The same manner as in Example 1 was performed except that the electrolyte solution in which TEP, FEC and SL were mixed in a ratio of TEP:FEC:SL=65:5:30 (volume ratio) and further LiPF$_6$ as the support salt was dissolved in a concentration of 1 mol/L was used. The result is shown in Table 1.

Example 12

The same manner as in Example 1 was performed except that the electrolyte solution in which TEP, FEC, t-DFEC (trans difluoroethylene carbonate) and TTFP were mixed in a ratio of TEP:FEC:t-DFEC:TTFP=91:5:2:2 (volume ratio) and further LiPF$_6$ as the support salt was dissolved in a concentration of 1 mol/L was used. The result is shown in Table 1.

Example 13

The same manner as in Example 1 was performed except that the electrolyte solution in which TEP, FEC, t-DFEC and TTFP were mixed in a ratio of TEP:FEC:t-DFEC:TTFP=83:5:10:2 (volume ratio) and further LiPF$_6$ as the support salt was dissolved in a concentration of 1 mol/L was used. The result is shown in Table 1.

Comparative Example 1

The same manner as in Example 1 was performed except that the electrolyte solution in which TEP and FEC were mixed in a ratio of TEP:FEC=95:5 (volume ratio) and further LiPF$_6$ as the support salt was dissolved in a concentration of 1 mol/L was used. The result is shown in Table 1.

Comparative Example 2

The same manner as in Example 1 was performed except that the electrolyte solution in which TEP and FEC were mixed in a ratio of TEP:FEC=95:5 (volume ratio) and further LiPF$_6$ as the support salt was dissolved in a concentration of 1 mol/L was used, and only graphite was used as the negative electrode active material. The result is shown in Table 1.

Comparative Example 3

The same manner as in Example 1 was performed except that the electrolyte solution in which TEP, FEC and t-DFEC were mixed in a ratio of TEP:FEC:t-DFEC=93:5:2 (volume ratio) and further LiPF$_6$ as the support salt was dissolved in a concentration of 1 mol/L was used. The result is shown in Table 1.

TABLE 1

| | Electrolyte solution | | | | | | | | Capacity retention ratio |
|---|---|---|---|---|---|---|---|---|---|
| | Phosphate ester | | Fluorinated carbonate | | Fluorinated phosphate ester | | High dielectric constant solvent | | |
| | Type | Vol % | Type | Vol % | Type | Vol % | Type | Vol % | % |
| Example 1 | TEP | 93 | FEC | 5 | TTFP | 2 | | | 94 |
| Example 2 | TEP | 90 | FEC | 5 | TTFP | 5 | | | 95 |
| Example 3 | TEP | 85 | FEC | 5 | TTFP | 10 | | | 93 |
| Comparative Example 4 | TEP | 75 | FEC | 5 | TTFP | 20 | | | 91 |
| Example 5 | TEP | 90 | FEC | 5 | | | EC | 5 | 94 |
| Example 6 | TEP | 85 | FEC | 5 | | | EC | 10 | 95 |
| Example 7 | TEP | 75 | FEC | 5 | | | EC | 20 | 94 |
| Example 8 | TEP | 90 | FEC | 5 | | | SL | 5 | 91 |
| Example 9 | TEP | 85 | FEC | 5 | | | SL | 10 | 95 |
| Example 10 | TEP | 75 | FEC | 5 | | | SL | 20 | 95 |
| Example 11 | TEP | 65 | FEC | 5 | | | SL | 30 | 93 |
| Example 12 | TEP | 91 | FEC t-DFEC | 5 2 | TTFP | 2 | | | 96 |
| Example 13 | TEP | 83 | FEC t-DFEC | 5 10 | TTFP | 2 | | | 93 |
| Comparative Example 1 | TEP | 95 | FEC | 5 | | | | | 90 |
| Comparative Example 2 | TEP | 95 | FEC | 5 | | | | | 0 |
| Comparative Example 3 | TEP | 93 | FEC t-DFEC | 5 2 | | | | | 91 |

When the electrolyte solution in which 2% by volume or 5% by volume of the fluorinated phosphate (TTFP) was mixed was used, which is different from the electrolyte solution comprising TEP:FEC (95:5), the capacity retention ratio at the 20th cycle was improved. It is considered that the reason for this is because TTFP having a fluorinated alkyl group (0.2 to 0.3V vs Li/Li$^+$) was previously decomposed on the negative electrode since it was reductively degraded at a nobler potential than TEP (0.1 to 0.2V vs Li/Li$^+$). It can be concluded that a film due to such degradation served to suppress a side reaction (Examples 1 and 2, and Comparative Example 1). On the other hand, as the amount of TTFP to be mixed increased, the capacity retention ratio decreased. It is considered that the reason for this is because TTFP having a high viscosity (viscosity; 4.7 mPas) was added instead of TEP (viscosity; 2.0 mPas), leading to reduction of the ion conductivity of the electrolyte solution to hardly allow the reaction on the electrode at an electric current of 1 C to occur (Comparative Example 4).

Therefore, the amount of TTFP to be mixed is desirably 10% by volume or less and more desirably 5% by volume or less. In addition, since TTFP has a fluorinated alkyl group and thus has a higher flame-retardant effect than TEP (Non Patent Literature 1), the flame retardancy of the electrolyte solution as a whole can be improved by increasing the amount of TTFP to be mixed. It could also be confirmed that the rate characteristics was significantly improved by mixing and adding FEC and t-DFEC, and further adding TTFP. The reason for this can be concluded because t-DFEC containing many fluorine substituents was degraded at a nobler potential than FEC and thus an SEI film having better rate characteristics was formed (Examples 12 and 13, and Comparative Example 1). In addition, since it is considered that the too large amount of t-DFEC is mixed to form a film having a high resistance, the amount of t-DFEC to be mixed is desirably 10% by volume or less.

It could be confirmed that the TEP:FEC electrolyte solution (electrolyte solution containing TEP and FEC) was mixed with a material having a high specific dielectric constant, such as EC or SL, thereby improving the capacity retention ratio (Examples 5 to 11). The reason for this is considered as follows. It is considered that TEP itself has a low specific dielectric constant of 13 and thus the electrolyte solution containing TEP as the main solvent (preferably 70% by volume or more) has a low dissociation ability of lithium ions in the electrolyte solution. Therefore, it can be concluded that since the number of lithium ions dissociated is small and the number of lithium ions to be reacted with the electrode is small, such ions cannot move according to a cycle at a high rate. Then, it can be concluded that in order to improve dissociation ability of lithium ions, a material having a high specific dielectric constant is mixed to improve the dissociation ability to increase the number of lithium ions involving the reaction. However, if the material having a high specific dielectric constant (solvent having a specific dielectric constant of 15 or more) is mixed, viscosity generally increases and thus the ion conductivity of the electrolyte solution decreases. As a result, the decrease in capacity due to charge-discharge cycles is also observed, and thus it is not desirable to make the mixing amount too high. Therefore, the amount of the high dielectric constant solvent to be mixed in the electrolyte solution is desirably 30% by volume or less and more desirably 20% by volume or less, and it is desirably 10% by volume or less in the case where cycle characteristics at a higher rate are demanded (Examples 5 to 11). In order to continue to maintain the flame retardancy of the electrolyte solution, it is desirable to increase the amount of TEP to be mixed, and the mixing ratio of the high dielectric constant solvent may also be 5% by volume or less.

Herein, the electrolyte solution containing 95% of phosphate in the electrode made of only a graphite material in Comparative Example 2 could not achieve the discharge capacities at 2 to 3rd cycles, and thus the capacity retention ratio was described to be 0% (Comparative Example 2). That is, in the electrode made of only a graphite material, it can be seen that the electrolyte solution containing TEP as the main solvent does not allow the battery to operate. On the other hand, it could be confirmed that only in the case of using the negative electrode active material containing Si or SiO, the battery is allowed to operate even if using TEP as the main solvent.

INDUSTRIAL APPLICABILITY

The present embodiment can be utilized in various industrial fields that require for a power supply and in an industrial field concerning transportation, storage and supply of electric energy. Specifically, it can be utilized for, for example, a power supply of a mobile device such as a mobile phone and a notebook computer; a power supply of a moving or transport medium such as a train, a satellite and a submarine, including an electric vehicle such as an electric car, a hybrid car, an electric motorcycle, and an electric power-assisted bicycle; a back-up power supply such as UPS; and a power storage device for storing an electric power generated by solar power generation, wind power generation, and the like.

EXPLANATION OF REFERENCE a negative electrode
b separator
c positive electrode
d negative electrode current collector
e positive electrode current collector
f positive electrode terminal
g negative electrode terminal

The invention claimed is:

1. A secondary battery comprising:
   an electrode element comprising a positive electrode and a negative electrode;
   an electrolyte solution; and
   an outer casing enclosing the electrode element and the electrolyte solution therein, wherein:
   the negative electrode comprises a negative electrode active material bound to a negative electrode current collector, the negative electrode active material comprising at least one of a metal capable of forming an alloy with lithium, and a metal oxide capable of intercalating and deintercalating lithium ions; and
   the electrolyte solution comprises:
   65 to 99% by volume of a phosphate ester compound;
   0.01 to 30% by volume of a fluorinated carbonate compound; and
   0.1 to 10% by volume of a halogenated phosphate ester compound and/or 0.1 to 30% by volume of a solvent having a specific dielectric constant of 15 or more.

2. The secondary battery according to claim 1, wherein the phosphate ester compound is represented by the following formula (1):

wherein Rs, Rt and Ru each independently represent an alkyl group, an alkenyl group, an aryl group, a cycloalkyl group, or a silyl group.

3. The secondary battery according to claim 2, wherein in the formula (1), Rs, Rt and Ru each independently represent an alkyl group having 10 or less carbon atoms.

4. The secondary battery according to claim 1, wherein the fluorinated carbonate compound is fluoroethylene carbonate and/or difluoroethylene carbonate.

5. The secondary battery according to claim 1, wherein the electrolyte solution further contains a support salt comprising an imide anion.

6. The secondary battery according to claim 1, wherein the negative electrode active material is bound to the negative electrode current collector via a binder comprising polyimide or polyamide-imide.

7. The secondary battery according to claim 2, wherein two or more of Rs, Rt, and Ru are bonded to form a cyclic structure.

8. The secondary battery according to claim 1, wherein the halogenated phosphate ester compound is represented by the following formula (2):

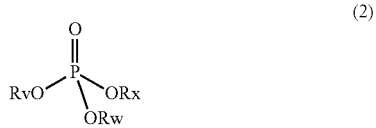

wherein Rv, Rw and Rx each independently represent a halogenated alkyl group, a halogenated alkenyl group, a halogenated cycloalkyl group, a halogenated aryl group, or a silyl group.

9. The secondary battery according to claim 8, wherein at least one of Rv, Rw, and Rx is a halogenated alkyl group, a halogenated alkenyl group, a halogenated cycloalkyl group, or a halogenated aryl group.

10. The secondary battery according to claim 8, wherein two or more of Rv, Rw, and Rx are bonded to form a cyclic structure.

11. The secondary battery according to claim 8, wherein Rv, Rw, and Rx each independently represent a halogenated alkyl group having 10 or less carbon atoms.

12. An electrolyte solution for a secondary battery, comprising:
65 to 99% by volume of a phosphate ester compound;
0.01 to 30% by volume of a fluorinated carbonate compound; and
0.1 to 10% by volume of a halogenated phosphate ester compound and/or 0.1 to 30% by volume of a solvent having a specific dielectric constant of 15 or more.

13. The electrolyte solution for a secondary battery according to claim 12, wherein
the phosphate ester compound is represented by the following formula (1):

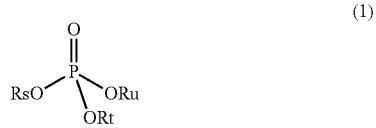

wherein Rs, Rt, and Ru each independently represent an alkyl group, an alkenyl group, an aryl group, a cycloalkyl group, or a silyl group, and any two or all of Rs, Rt, and Ru are bonded to form a cyclic structure, and the halogenated phosphate ester compound is represented by the following formula (2):

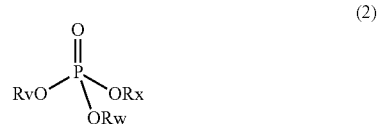

wherein Rv, Rw, and Rx each independently represent a halogenated alkyl group, a halogenated alkenyl group, a halogenated cycloalkyl group, a halogenated aryl group, or a silyl group, wherein at least one of Rv, Rw, and Rx is a halogenated alkyl group, a halogenated alkenyl group, a halogenated cycloalkyl group, or a halogenated aryl group, and any two or all of Rv, Rw, and Rx are bonded to form a cyclic structure.

14. The electrolyte solution for a secondary battery according to claim 13, wherein
in the formula (1), Rs, Rt, and Ru each independently represent an alkyl group having 10 or less carbon atoms; and
in the formula (2), Rv, Rw, and Rx each independently are a halogenated alkyl group having 10 or less carbon atoms.

15. The electrolyte solution for a secondary battery according to claim 12, wherein the fluorinated carbonate compound is fluoroethylene carbonate and/or difluoroethylene carbonate.

16. A method of forming a secondary battery, comprising:
providing a positive electrode;
forming a negative electrode by binding a negative electrode active material to a negative electrode current collector with a binder, the negative electrode active material comprising at least one of a metal capable of forming an alloy with lithium, and a metal oxide capable of intercalating and deintercalating lithium ions; and
providing an electrolyte solution comprising 65 to 99% by volume of a phosphate ester compound, 0.01 to 30% by volume of a fluorinated carbonate compound, and 0.1 to 10% by volume of a halogenated phosphate ester compound.

17. The method of forming the secondary battery of claim 16, comprising enclosing the positive electrode, the negative electrode, and the electrolyte solution in an outer casing.

18. The method of forming the secondary battery of claim 16, wherein the binder comprises polyimide or polyamide-imide.

19. The method of forming the secondary battery of claim 16, wherein the electrolyte solution comprises 0.1 to 30% by volume of a solvent having a specific dielectric constant of 15 or more.

20. The method of forming the secondary battery of claim 16, wherein the electrolyte solution comprises an imide anion.

* * * * *